(12) United States Patent
Behroozi

(10) Patent No.: US 8,036,130 B2
(45) Date of Patent: Oct. 11, 2011

(54) MINIMIZATION OF CHANNEL FILTERS WITHIN WIRELESS ACCESS NODES

(75) Inventor: Cyrus Behroozi, Menlo Park, CA (US)

(73) Assignee: Tropos Networks, Inc., Sunnyvale, CA (US)

( * ) Notice: Subject to any disclaimer, the term of this patent is extended or adjusted under 35 U.S.C. 154(b) by 851 days.

(21) Appl. No.: 12/074,427

(22) Filed: Mar. 4, 2008

(65) Prior Publication Data

US 2008/0151816 A1 Jun. 26, 2008

Related U.S. Application Data

(62) Division of application No. 10/820,493, filed on Apr. 8, 2004, now Pat. No. 7,362,737.

(51) Int. Cl.
*H04L 12/26* (2006.01)
(52) U.S. Cl. .......................... 370/238; 370/338; 455/445
(58) Field of Classification Search .................. 370/238, 370/338; 455/445
See application file for complete search history.

(56) References Cited

U.S. PATENT DOCUMENTS

| 6,631,273 | B1 | 10/2003 | Eswein et al. |
| 6,728,514 | B2 | 4/2004 | Bandeira |
| 6,804,491 | B1 | 10/2004 | Uesugi |
| 7,031,293 | B1 | 4/2006 | Srikrishna et al. |
| 7,161,926 | B2 * | 1/2007 | Elson et al. .................... 370/338 |
| 2002/0061729 | A1 | 5/2002 | Zhang |
| 2002/0107023 | A1 * | 8/2002 | Chari et al. .................... 455/445 |
| 2004/0264379 | A1 * | 12/2004 | Srikrishna et al. ............ 370/238 |

* cited by examiner

*Primary Examiner* — Albert T Chou
(74) *Attorney, Agent, or Firm* — Brian R. Short

(57) ABSTRACT

A wireless access node includes a first radio operable to transmit/receive on one of at least N transmission channels. A second radio is operable to transmit/receive on another one of the at least N transmission channels. A first filter bank, of less than N filters, filters a first transmit/receive signal of the first radio. A second filter bank, of less than N filters, filters a second transmit/receive signal of the second radio. Generally, N is greater than 2.

7 Claims, 8 Drawing Sheets

US 8,036,130 B2

MINIMIZATION OF CHANNEL FILTERS WITHIN WIRELESS ACCESS NODES

RELATED APPLICATIONS

This application is a divisional of U.S. patent application Ser. No. 10/820,493 filed Apr. 8, 2004 now U.S. Pat. No. 7,362,737.

FIELD OF THE INVENTION

The invention relates generally to communication networks. More particularly, the invention relates to minimization of channel filters within wireless access nodes of a mesh network.

BACKGROUND OF THE INVENTION

Wireless access devices are becoming more prevalent. Wireless access can be implemented in many different forms, including connecting a wireless access device (client) through a wireless mesh network that provides connection to a wired network. FIG. 1 shows a wireless mesh network that includes a client device 140. The wired gateway in the FIG. 1 can accept clients directly, so it can also be an access node. The client device 140 is wirelessly connected to an access node 130. The wireless access node 130 is wirelessly connected to a wired gateway 110 through another wireless access node 120. The wired gateway 110 can provide access to the internet 100 as an access node.

The transfer of information from the client 140 to the gateway 110 is generally bidirectional. That is, information flows from the client device 140 to the gateway 110 (generally referred to as upstream traffic) and information flows from the gateway 110 to the client device 140 (generally referred to as downstream traffic). The amount of data per unit time that flows between the gateway 110 and the client device 140 is called throughput. The maximum amount of data that can flow per unit time is called maximum throughput. It is desirable to maximize the throughput of wireless mesh networks.

The wireless connections 150, 160, 170 between the gateway 150, the access nodes 120, 130 and the client device 140, can be implemented with either full duplex or half duplex transceivers. Full duplex transceivers are able to transmit and receive at the same time, whereas half duplex receives can either transmit or receive at a given time. Half-duplex transceivers are typically cheaper and more easily available because they are less complex than full duplex transceivers.

Mesh networks such as the mesh network shown in FIG. 1 can suffer from interference problems. For example, the access node 130 can suffer from self-interference or interference due to transmission signals generated by other access nodes. A first dashed line 180 shows self-interference in which signals transmitted from access node 130 through channel 170 are coupled back to the access node 130 through the channel 160. Other interference is shown by dashed line 190 in which the signals transmitted from the access node 130 through the channel 170 are coupled to the access node 120 through the channel 150. This interference can reduce the maximum throughput delivered by the mesh.

Mesh networks can be constructed with omni-directional antennas to allow the relative orientations of the access nodes and clients to change with respect to each other. Omni-directional antennas, unlike directional antennas, allow access nodes and clients to communicate without having to maintain strict control over the relative locations of the access nodes and clients. However, interference between communication channels is more difficult to control with mesh networks that include omni-directional antennas.

Interference between access nodes and clients can be reduced by allocating different non-overlapping frequency spectrum to different channels that are close in proximity. For example, a first channel 150 can be allocated a first frequency spectrum channel, and a second channel 160 can be allocated a second frequency spectrum channel. Therefore, the interference between the first channel 150 and the second channel 160 can be greatly reduced. A third channel 170 can include a third frequency spectrum channel.

Actual implementations of mesh networks still suffer some interference even when different frequency spectra are allocated for different transmission channels of the mesh network. Some signal power from one channel will always couple into a neighboring channel because the signals transmitted are never completely contained within the designated channel. That is, for example, signals transmitted over the first channel 150 will always include some signal power within the second channel 160 and the third channel 170. This undesired adjacent channel signal power causes interference. Furthermore, even if the transmitted signals are completely contained within their designated channels, their relatively high power can cause loss of sensitivity for nearby receivers.

Filtering can be included within radios of the access node to filter transmitted and received signals of the radios. The filtering reduces the effects of undesired neighboring transmission channel signals. However, the filtering can add undesired cost to the access nodes.

It is desirable to have a wireless mesh network in which the throughput of the mesh network is optimized while minimizing interference and minimizing hardware costs associated with access nodes of the wireless mesh network.

SUMMARY OF THE INVENTION

The invention includes an apparatus and method for minimizing interference and hardware costs of wireless access nodes.

A first embodiment of the invention includes a wireless access node. The wireless access node includes a first radio operable to transmit/receive on one of at least N transmission channels. A second radio is operable to transmit/receive on another one of the at least N transmission channels. A first filter bank, of less than N filters, filters a first transmit/receive signal of the first radio. A second filter bank, of less than N filters, filters a second transmit/receive signal of the second radio. Generally, N is greater than 2.

Another embodiment of the invention also includes a wireless access node. The wireless access node includes a first radio operable to transmit/receive on one of at least N transmission channels, and a second radio operable to transmit/receive on another one of the at least N transmission channels, wherein N is greater than 2. In a first mode, the access node is in communication with a first device and a second device, the first radio being in communication with the first device, and the second radio being in communication with the second device. In a second mode, the communication of the access node to the first device and the second device is reversible so that the first radio is in communication with the second device and the second radio is in communication with the first device.

Another embodiment of the invention includes a wireless mesh network. The wireless mesh network includes a plurality of wireless access nodes. Each wireless access nodes is in communication with at least one other wireless access node. Each wireless access node includes a first radio operable to transmit/receive on one of at least N transmission channels. A second radio is operable to transmit/receive on another one of the at least N transmission channels. A first filter bank, of less than N filters, filters a first transmit/receive signal of the first radio. A second filter bank, of less than N filters, filters a second transmit/receive signal of the second radio.

Another embodiment if the invention includes a method of routing information through at least one access node of a mesh network. The method includes selecting a routing path between a client and a gateway, selecting transmission channel for each hop of the selected routing path, and selecting an upstream versus downstream orientation of the at least one access node within the selected routing path, wherein the orientation of the at least one access node is able to rotate. The method can further include selecting channel filtering within the at least one access node within the selected routing path.

Other aspects and advantages of the present invention will become apparent from the following detailed description, taken in conjunction with the accompanying drawings, illustrating by way of example the principles of the invention.

DETAILED DESCRIPTION

Figure 1:
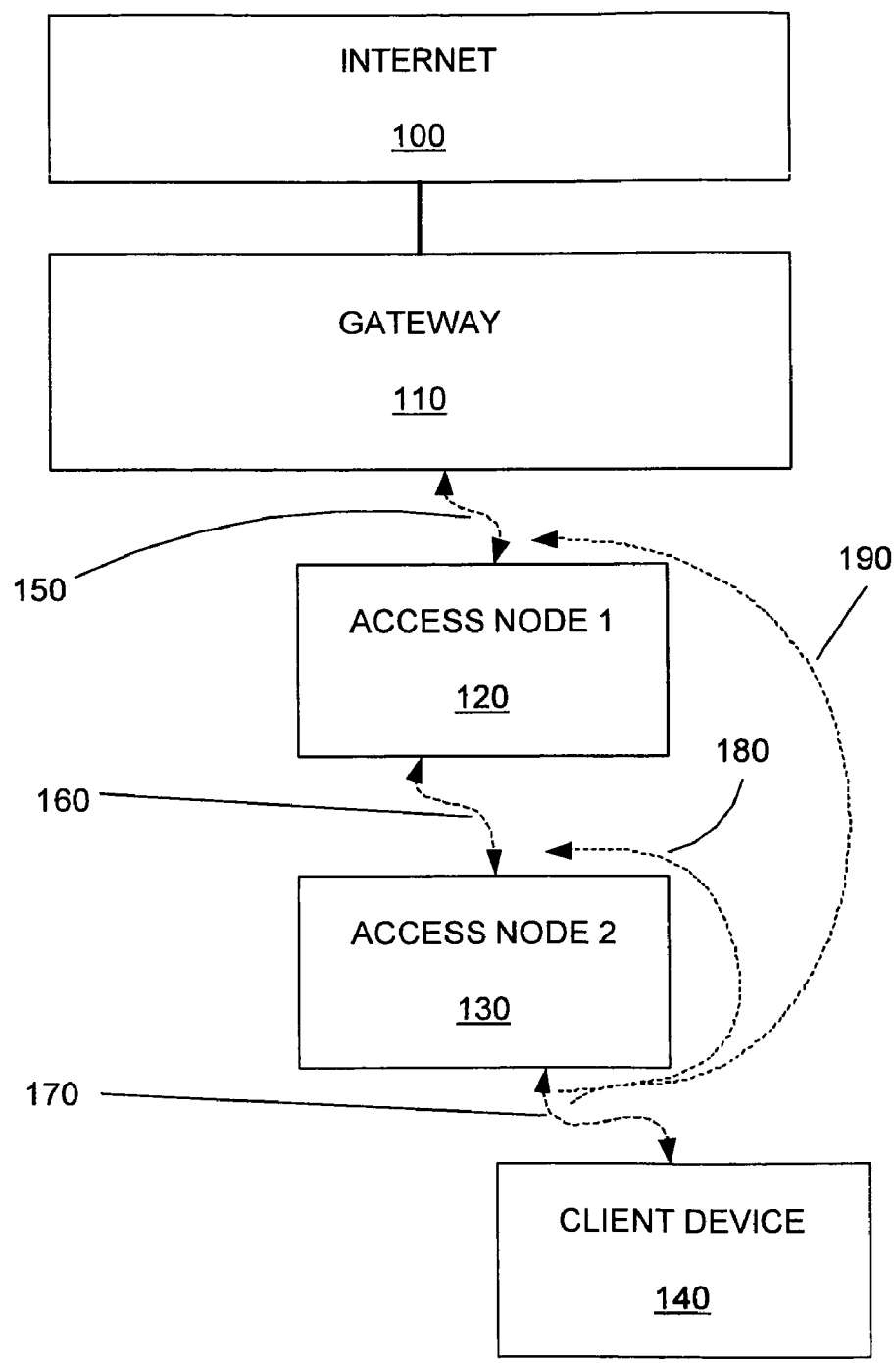
FIG. 1 shows a network device connected to a client through a mesh network.

As shown in the drawings for purposes of illustration, the invention is embodied in methods of routing within a mesh network, methods of filtering transmission signals of the access nodes, and filtering systems within the access nodes of mesh networks.

Figure 2:
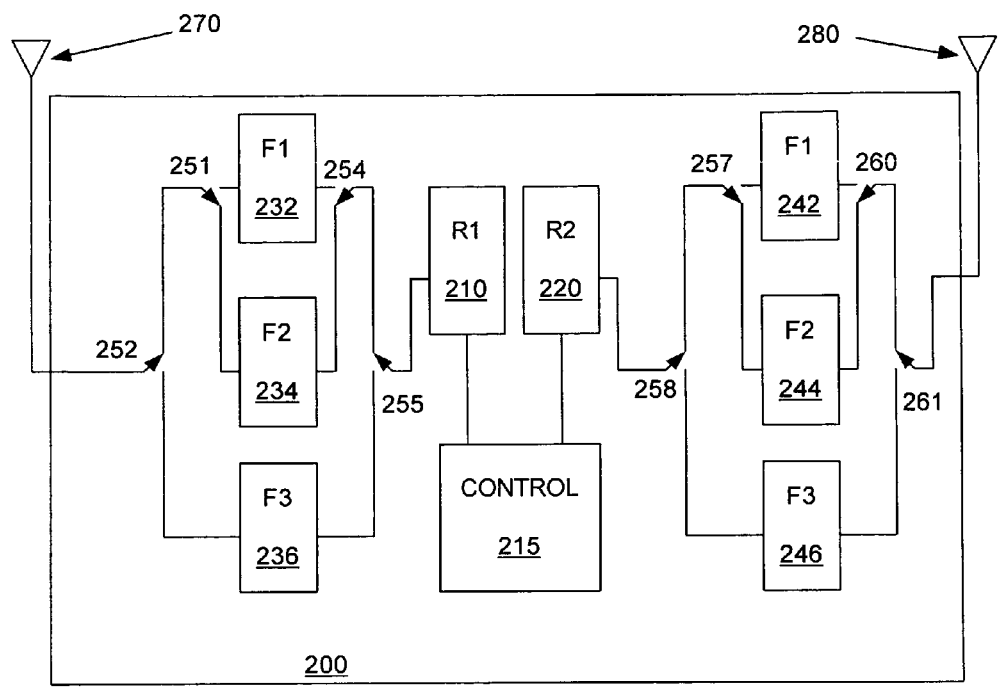
FIG. 2 shows an access node that includes channel filtering.

FIG. 2 shows an access node 200 that includes channel filtering. The access node 200 includes a first radio 210 and a second radio 220. The first radio 210 can be dedicated to wireless communication with upstream devices of a mesh network, and the second radio 220 can be dedicated to wireless communication with downstream devices of the mesh network. This embodiment of the access node 200 includes three communication channels per radio 210, 220. Three filters 232, 234, 236 of the first radio 210 provide filtering of the wireless signals at frequencies corresponding to the three communication channels associated with the first radio 210. Three other filters 242, 244, 246 provide filtering of wireless signals at frequencies associated with the three communication channels associated with the second radio 220. Clearly, the number of filters can be increased for systems that include more than three communication channels. The filtered signals are received and transmitted through omni-directional antennas 270, 280. Another configuration can include switchable sector antennas which include many of the same pitfalls as omni-directional antennas. Operation of the first radio and the second radio is controlled by a controller 215.

The filters 232, 234, 236, 242, 244, 246 are configured to pass signals within the frequency spectrum that corresponds with the communication channel associated with each of the filters. Signals outside of the intended frequency spectra of the filters are to be rejected, thereby reducing interference between the communication channels. The first filter set (F1) 232, 242 pass signals having carrier frequencies within the first communications channel. The second filter set (F2) 234, 244 pass signals having carrier frequencies within the second communications channel. The third filter set (F3) 236, 246 pass signals having carrier frequencies within the third communications channel.

As described, the filtering of the access node 200 of FIG. 2 helps reduce interference. However, the filtering is difficult to implement due to other problems. The switches 251, 252, 254, 255, 257, 258, 260, 261 can be operationally undesirable because the switches are lossy and require careful impedance matching. Additionally, the six filters of this embodiment can be expensive. A received or transmitted signal may have to pass through as many as four lossy switches, which results in signal loss and lower system sensitivity. The second set of filters 234, 244 must be symmetric and cannot be tailored for better rejection of either the upper or lower bands (F1, F3). Access nodes that include more than three channels must include an even greater number of switches, increasing the signal loss and decreasing the system sensitivity even more. Clearly, the access node filter configuration of FIG. 2 is not adaptable for scaling.

Figure 3:
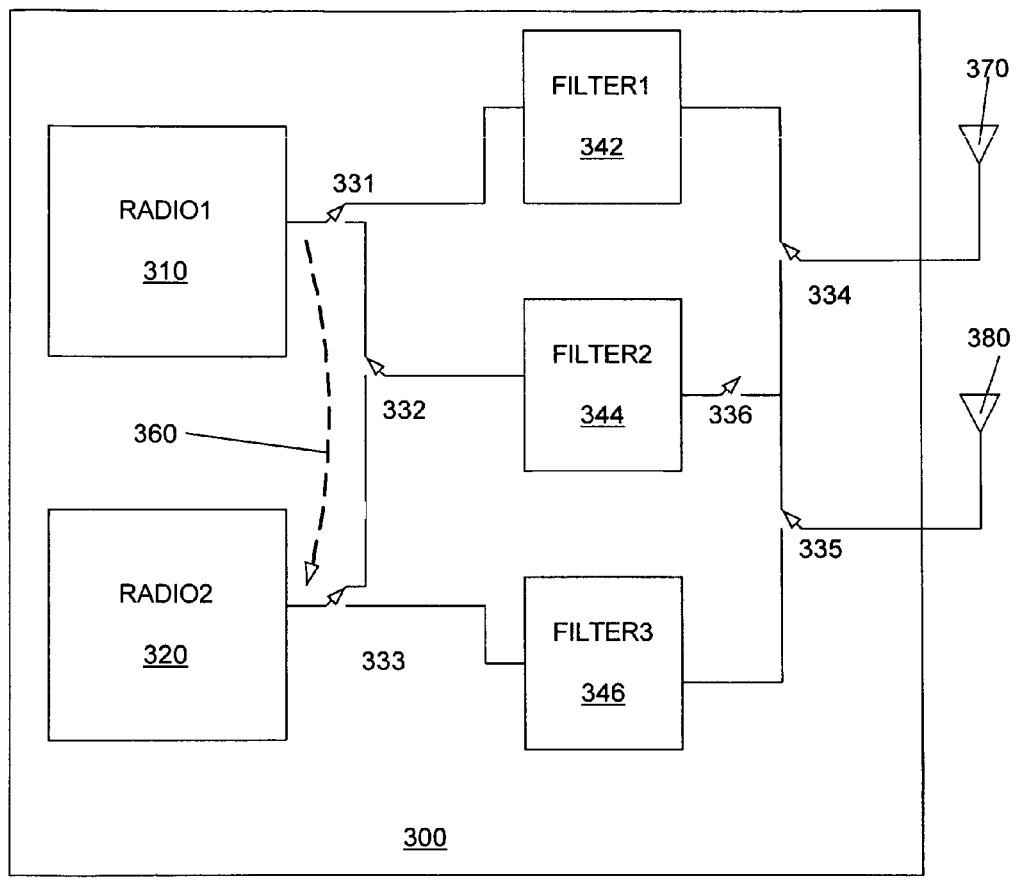
FIG. 3 shows an access node that includes channel filtering, and is configured to allow reversible transmission.

FIG. 3 shows an access node 300 that includes channel filtering, and is configured to allow reversible transmission. The reversible transmission allows a reduction in the number of filters. This is advantageous because the three channel filters of the access node 300 are substantially less expensive than the six channel filters of the access node 200 of FIG. 2.

Switches 331, 332, 333, 334, 335, 336 are controlled so that each radio 310, 320 has transmitted and received signals filtered at one of three possible communication channel frequencies. A first filter (FILTER1) 342 passes signals having a carrier frequencies corresponding to a first communication channel, a second filter (FILTER2) 344 passes signals having carrier frequencies corresponding to a second communication channel, and a third filter (FILTER3) passes signals having carrier frequencies corresponding to a third communication channel. The communication signals of the radios 310, 320 are received and transmitted through omni-directional antennas 370, 380.

This reversible transmission configuration allows a reduction in the number of filters. However, this configuration can suffer due to a lack of isolation between the filtering switches 331,332,333,334,335,336 of the radios. The switches 332, 333,334,335,336 route the transmission signals of the first radio 310 and the second radio 330 through selected filters 342, 344, 346. Coupling can occur between the transmission signals of the radios 310, 320 through the switches 332, 333, 334, 335, 336 as shown, for example, by arrow 360. This coupling to some extent defeats the purpose of filtering, which is to isolate the two radios from one another. That is, the coupling can cause signals from one transmission channel to interfere with signals of another transmission channel. Additionally, the second filter 344 cannot be tailored for rejection of either the frequencies of the first communication channel or the third communication channel.

Reversible Transmission

Reversible transmission can be described in the context of an access node within a mesh network. As previously described, an access node within a mesh network includes upstream data traffic (data traveling from a client to a gateway) and downstream data traffic (data traveling from the gateway to the client). The access node 200 of FIG. 2 includes one radio 210 dedicated to upstream traffic and one radio dedicated to downstream traffic 220.

Reversible transmission, as defined here, includes each radio of an access node being able to handle both upstream and downstream traffic as determined by routing between the client and the gateway. With omni-directional antennas, the rotation between upstream and downstream can be accomplished by the routing. For directional or smart antenna arrays, the rotation can be additionally accomplished by physically rotating the antennas, or by proper selection of antennas within an array.

Reversible transmission allows the channel responses associated with the radios of the access nodes to be tuned or customized. For example, one radio can be dedicated to transmission of a subset of the total number of transmission channels, and another radio of the access nodes can be dedicated to another subset of the total number transmission channels. That is, for example, if the access nodes include three transmission channels, one radio of each access node can be optimized for transmission over two of the channels, and another radio can be optimized for transmission over a different two channels. This allows each radio to be individually optimized. The optimization can include, for example, tuning of filters, amplifiers and antennas.

Generally, an embodiment of a reversible access node includes a first radio operable to transmit/receive on one of at least N transmission channels, and a second radio operable to transmit/receive on another one of the at least N transmission channels, wherein N is greater than 2. The access node can communicate with a first device and a second device (first and second devices include gateways, clients and other access nodes). In one mode the first radio communicates with the first device, and the second radio communicates with the second device, and in another (reverse) mode the first radio communicate with the second device and the second radio communicate with the first device.

Figure 4:
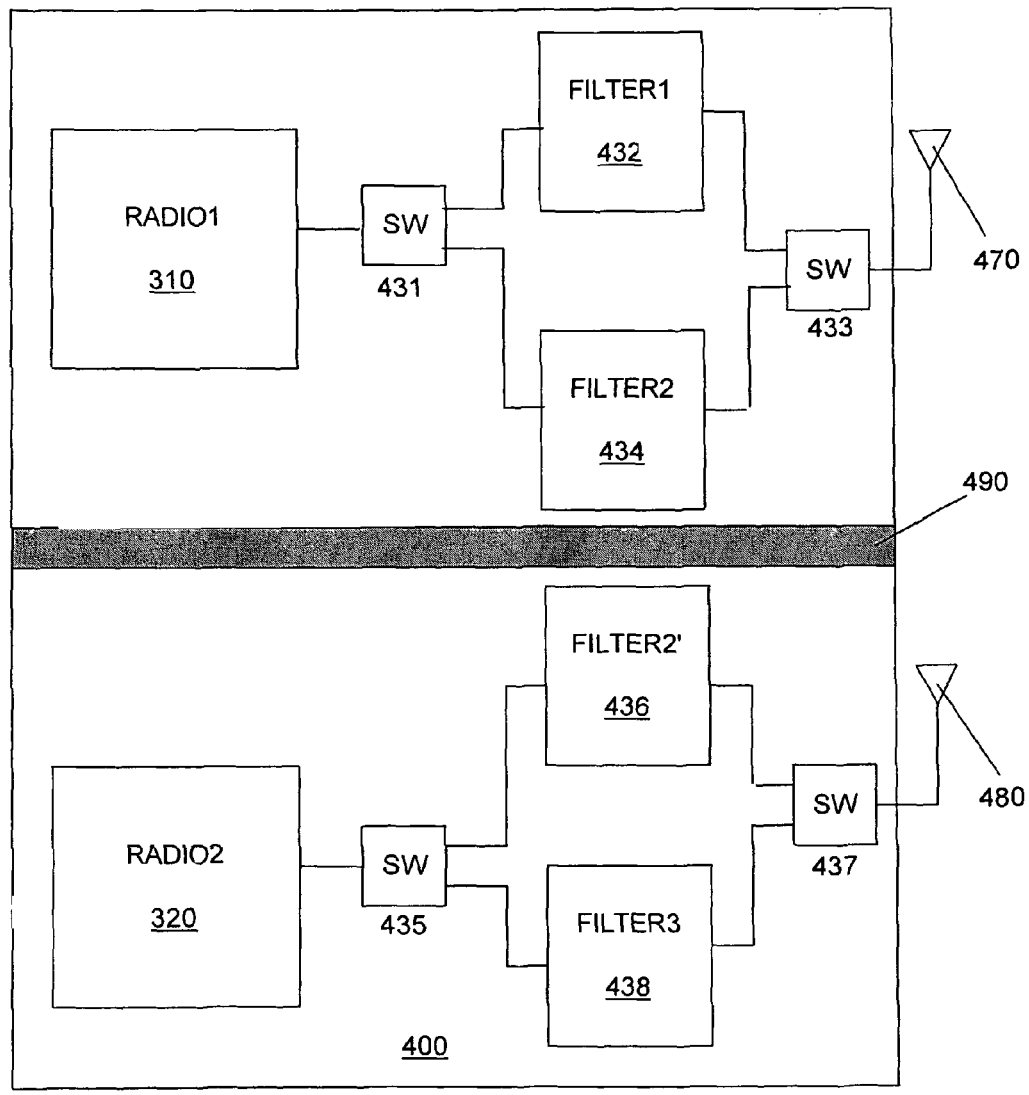
FIG. 4 shows an access node that includes channel filtering, is configured to allow reversible transmission, and provides isolation between radios within the access node.

FIG. 4 shows an access node 400 that includes channel filtering, is configured to allow reversible transmission, and provides isolation between radios within the access node 400. Like the access node 300 of FIG. 3, the access node 400 provides reversible transmission. However, the filtering and associated switches provide much better isolation between the transmission channels of a first radio 410 and a second radio 420, than the filtering and switches of the access node of FIG. 3. A barrier 490 is shown to depict physical isolation between the circuitry associated with the first radio 410 and the second radio 420. The transmission signals of the radios 410, 420 are transmitted and received through omni-directional antennas 470, 480.

The first radio 410 includes a first channel filter (FILTER1) 432, and a second channel filter (FILTER2) 434. The second radio 420 includes another second channel filter (FILTER2') 436 and a third channel filter (FILTER3) 438. The filters 432, 434, 436, 438 are tuned to pass desired signal frequencies (that is, signals within the corresponding transmission channel), and reject undesirable signal frequencies (that is, signals outside of the corresponding transmission channel). The two second channel filters 434, 436 can be tuned to pass the same signal frequencies, but can be individually tuned to provide greater rejection of particular out-of-band frequencies. As previously described, if the number of transmission channels is greater than three, then more channel filters can be included within the radios.

Switches 431, 433, 435, 437 control the routing of the receive and transmit signals through the filters 432, 434, 436, 438. As will be described, certain combinations of the filters 432, 434, 436, 438 of the radios 410, 420 are better than other combinations.

Figure 5A:
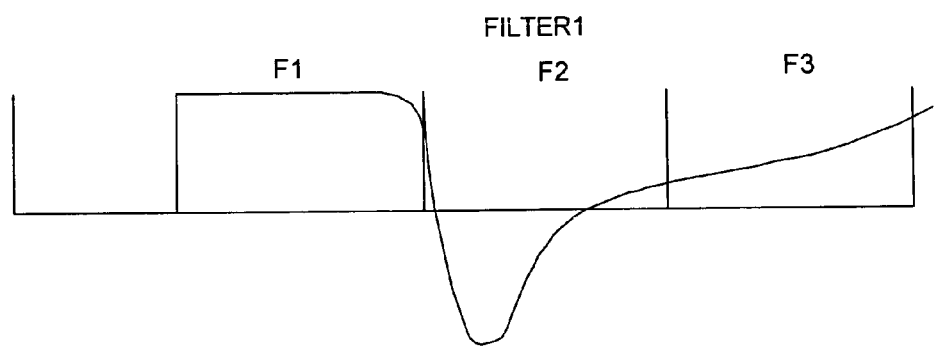
FIGS. 5A, 5B, 5C, 5D show frequency responses of tuned filters, according to one embodiment of the invention.
Figure 5B:
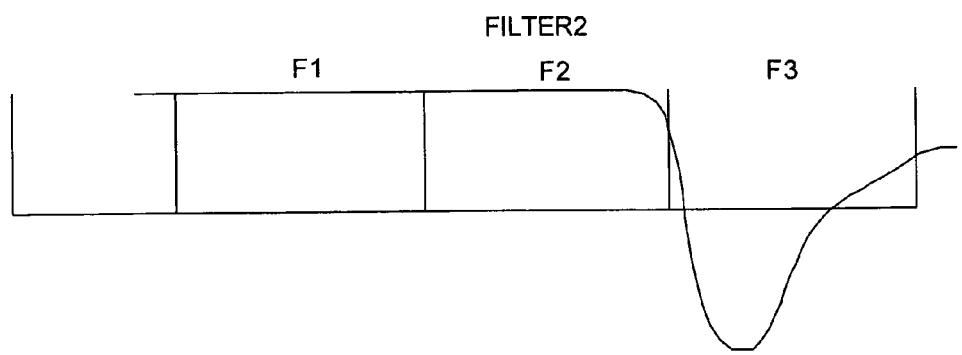
Figure 5C:
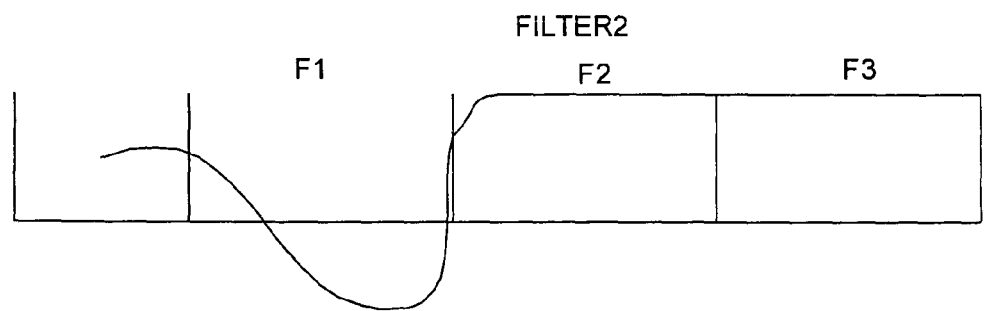
Figure 5D:
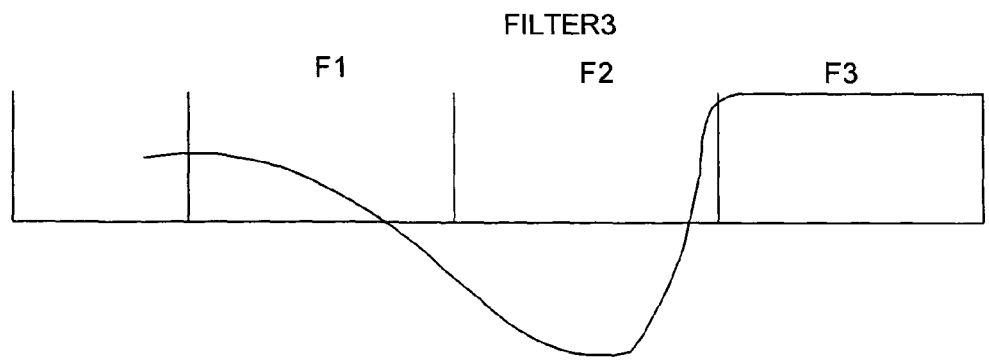

FIGS. 5A, 5B, 5C, 5D show examples of frequency responses of tuned filters 432, 434, 436, 438 of FIG. 4. As shown in FIG. 5A, the frequency response of the first tuned filter 432 depicts a pass band that corresponds with the frequency spectrum of the first transmission channel (F1), and provides a rejection band that includes primarily the frequency spectrum of the second transmission channel (F2). As shown in FIG. 5B, the frequency response of the second tuned filter 434 depicts a pass band that is intended to correspond with the frequency spectrum of the second transmission channel (F2), and provides a rejection band that includes primarily the frequency spectrum of the third transmission channel (F3).

The responses of the tuned filters are as shown due to ease of implementation. It is generally possible to create higher performing, lower loss filters that reject a particular band of frequencies rather than filters that pass a particular band of frequencies. As shown by the frequency responses (FIGS. 5A, 5B, 5C, 5D) of the tuned filters 432, 434, 436, 438, the filters are band reject filters. Proper pairing of the filters (pairing of complementary pairs) of each radio 410, 420 provides the most desirable response. For example, the first tuned filter 432 (response of FIG. 5A) and the second tuned filter 436 (response of FIG. 5C) are complementary pairs. The first tuned filter 432 rejects the frequency components of the second transmission channel the best, while the second tuned filter 436 rejects the frequency components of the first transmission channel the best. The second tuned filter 434 (response of FIG. 5B) and the third tuned filter 438 (response of FIG. 5D) are complementary pairs. The second tuned filter 432 rejects the frequency components of the third transmission channel the best, while the third tuned filter 438 rejects the frequency components of the second transmission channel the best.

Operationally, interference between transmission channels can minimized be selecting the filtering such that the filter of the first radio is the complement of the filter of the second radio. Again, as previously described, equivalent filtering configurations can be generated for mesh networks that include more than three communication channels between access nodes of the mesh networks.

Figure 6:
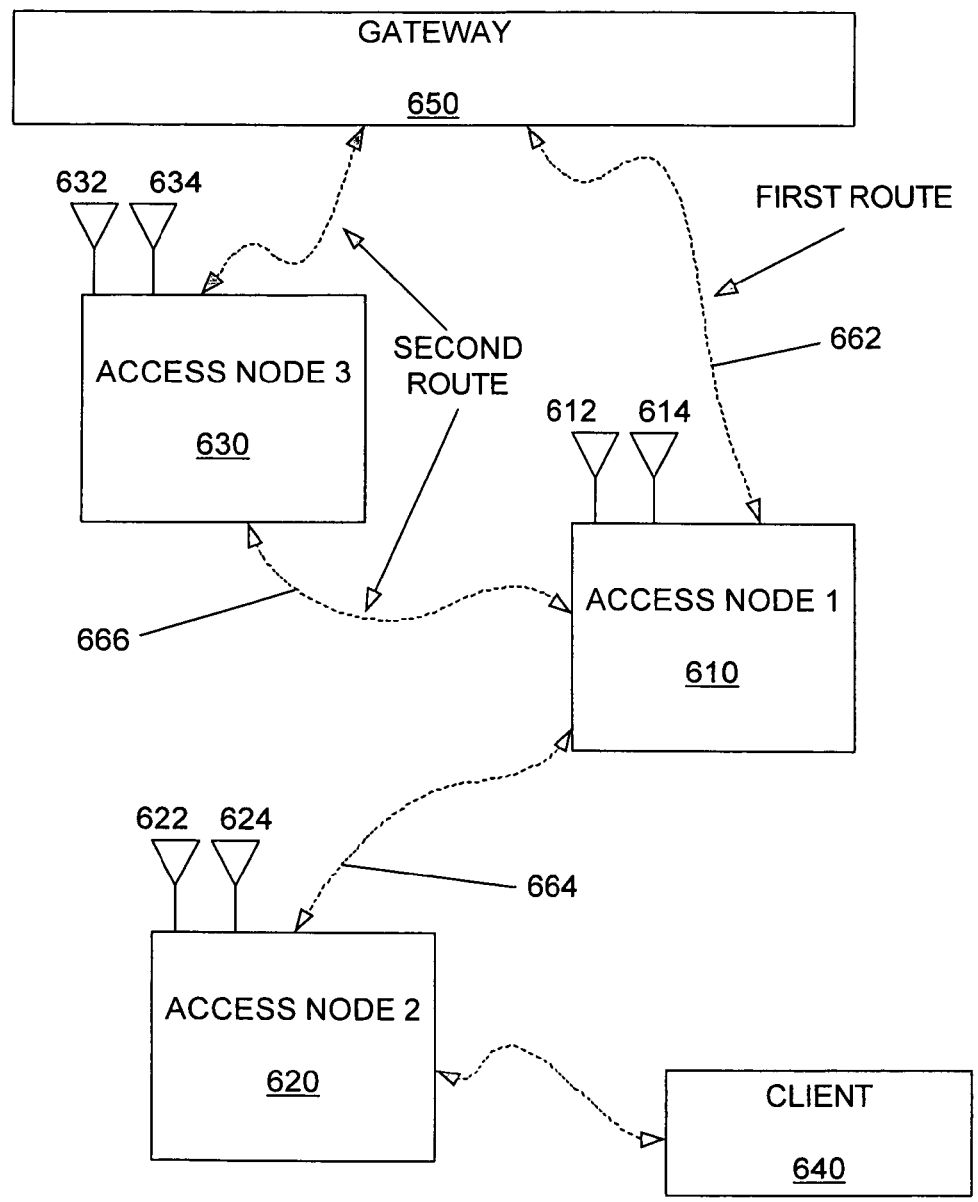
FIG. 6 shows a mesh network that includes access nodes similar to the access node of FIG. 4.

FIG. 6 shows a mesh network that includes access nodes similar to the access node of FIG. 4. The mesh network includes a first access node 610, a second access node 620 and third access node 630. The first access node 610 includes a first radio antenna 612 and a second radio antenna 614 associated with first and second radios of the first access node 610. The second access node 620 includes a first radio antenna 622 and a second radio antenna 624 associated with first and second radios of the second access node 620. The third access node 630 includes a first radio antenna 632 and a second radio antenna 634 associated with the first and second radios of the third access node 630. A gateway 650 includes an antenna 652 and a client 640 includes an antenna 642. As previously described the antennas 612, 614 622, 624, 632, 634 can be omni-directional, and the access nodes 610, 620, 630 are able to rotate.

A first selected route (FIRST ROUTE) between a client 640 and a gateway 650 can include the first access node 610 and the second access node 620. The link 662 between the gateway 650 and the first access node 610 can be over a second of three available transmission channels, and the link 664 between the first access node 610 and the second access node 620 can be over the third of three available transmission channels. In relation to previous discussions, the first access node 610 selects the second filter (FILTER2) for the communication link between the first access node 610 and the gateway 650, and the first access node 610 selects the third filter (FILTER3) for the communication link between the first access node 610 and the second access node 620. Correspondingly, the second access node 620 selects the first filters (FILTER1) for the communication link 664 between the second access node 620 and the first access node 610.

At a later time, the quality of the links may change causing the preferred route to include the third access node 630 between the first access node 610 and the gateway 650. The new route may require a change in the channel selections between the gateway and the access nodes 610, 620, 630. The new route (SECOND ROUTE) may require the first access node 610 to rotate so that the other radio of the first access node 610 is in communication with the new upstream device (the third access node 630) of the new route. For example, the communication link 666 between the third access node 630 and the first access node may require a selection of the third of the three available communication channels, causing a selection of the third filter by the first access node 610. The communication link 664 between the first access node 610 and the second access node 620 could change to the first communication channel, and select the first filter (FILTER1) for this link. Essentially, every route requires the access nodes within the route to select a preferred rotation. The selected rotation (relative to upstream devices and downstream devices) can change whenever a new route is initiated.

As shown in FIG. 6, a gateway is typically a wired device that provides a wireless access node access to a network. The gateway is a network entity that maintains an address mapping table for each client. The address mapping table generally includes a MAC-IP address mapping for the client devices. A gateway typically services several access nodes. An access node generally includes any point of attachment of a client with the mesh network. The access node can be a wireless access point, a wired access point, a router, a hub, a gateway, or any other networking device capable of attachment to a client. A client generally can include a laptop computer, a personal digital assistant (PDA), a cell-phone, or any other device that includes as interface card adaptable for use with the mesh network of the invention. A downlink interface is a network interface (logical or physical) that attaches an access node to a client device. An access node can have more that one downlink interface. All other interfaces other than downlink interfaces are termed uplink interfaces.

Routing Decisions

Routing decisions of the network are made to optimize the information throughput of the network, and to minimize interference of the network. Several different possible paths through a wireless mesh network may exist between a wired gateway and a wireless client. The selection is typically made initially by determining which of the available paths provides the optimal throughput. Once the initial selection has been made, the channel selections between the gateway, each access nodes and the client are generally made to minimize interference of the transmission signals along the selected path. After the channel selections have been made, the orientation (communication with an upstream or downstream device) of the radios within each access node is selected. Finally, the filters within each of the radios are selected.

An embodiment of the mesh network includes the gateways transmitting beacons. The beacons are received by access nodes if the access nodes are physically located with respect to a transmitting gateway so that beacons are successful received by the access node. Access nodes that are able to receive a beacon, re-broadcast a corresponding beacon for reception by downstream devices (other access nodes or clients). This permits each access node to determine at least one path to one or more gateways.

Each access node receives beacons that provide indicators of available routing paths to an upstream gateway. When a gateway broadcasts a beacon, the beacon is received by all first-level access nodes. The beacon is used to establish a route from each access node to the gateway. First level access nodes are defined by the fact that they receive data directly from the gateway. The first level access nodes re-broadcast the beacon data, attaching additional path data to it. The additional path information indicates to the second level access nodes that the path to the gateway includes the first level access node.

For one embodiment, the link quality of the beacon received determines whether that beacon is rebroadcast by the system. If the quality of the beacon is above a determined threshold, it is rebroadcast. Otherwise, it is not. For one embodiment, link quality is determined by persistence, i.e. the number of times in the last several routing cycles that the particular beacon was received. For one embodiment, the link quality reflects the reliability of paths to the gateway, as determined by the beacon being available for a reasonable time. The link quality is determined by continuously monitoring the beacons as they are received in every cycle. Whenever the beacon is not received in a cycle, the link quality associated with that path is decreased. The beacon is only transmitted if its link quality is sufficiently high.

For another embodiment, the depth of re-broadcast is determined for the system. Thus, for example, an access node may rebroadcast a beacon only if there are 5 or fewer hops between the access node and the gateway. For another embodiment, other link quality factors, such as traffic congestion, battery status of upstream access nodes, thickness of the pipeline, backend (i.e. gateway) capacity, latency, or other factors may be used to determine whether the beacon should be rebroadcast.

Figure 7:
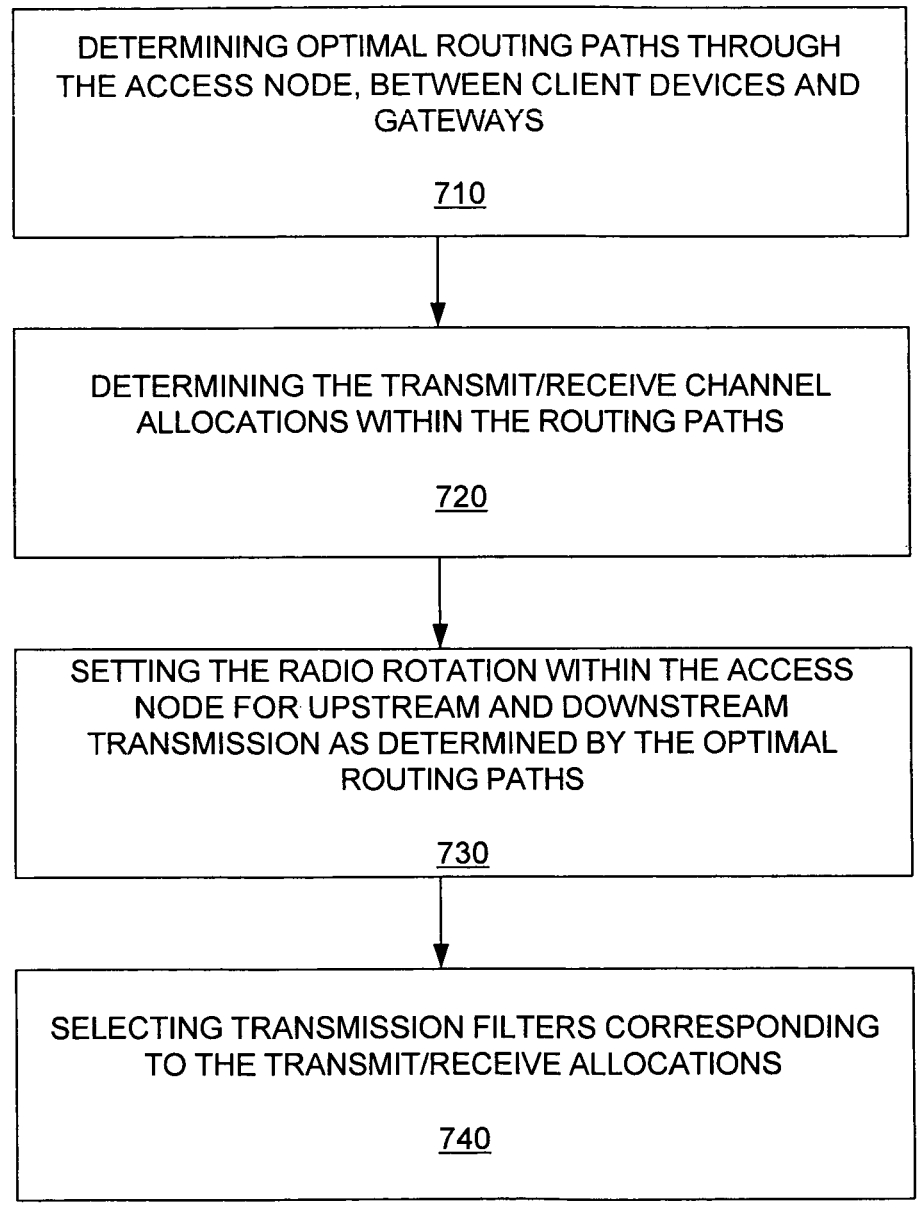
FIG. 7 is a flow chart showing steps includes in a method of operating an access node according to an embodiment of the invention.

FIG. 7 is a flow chart showing steps included in a method of operating an access node. A first step 710 includes determining optimal routing paths through the access node, between client devices and gateways. A second step 720 includes determining the transmit/receive channel allocations within the routing paths. A third step 730 includes setting the radio rotation within the access node for upstream and downstream transmission as determined by the optimal routing paths. A fourth step 740 includes selecting transmission filters corresponding to the transmit/receive allocations.

Although specific embodiments of the invention have been described and illustrated, the invention is not to be limited to the specific forms or arrangements of parts so described and illustrated. The invention is limited only by the appended claims.

The invention claimed is:

1. A wireless access node comprising:
   a first radio operable to transmit/receive on one of at least N transmission channels;
   a second radio operable to transmit/receive on another one of the at least N transmission channels, wherein N is greater than 2;
   a first filter bank of less than N filters for filtering a first transmit/receive signal of the first radio; and
   a second filter bank of at least 2 but less than N filters for filtering a second transmit/receive signal of the second radio, at least one of the pass-bands of the second filter bank being different than the pass-bands of the first filter bank;

wherein N is greater than 2, and wherein the combination of the first radio and the second radio are operable to transmit/receive on all N transmission channels;

wherein the access node is in communication with a first device and a second device, the first radio being in communication with the first device, and the second radio being in communication with the second device; and wherein the communication of the access node to the first device and the second device is reversible so that the first radio is in communication with the second device and the second radio is in communication with the first device.

2. The wireless access node of claim 1, wherein the access node is within a mesh network, and the first radio is in communication with at least one of the first device and the second device depending upon a selected mesh network routing.

3. A method of routing information through at least one access node of a mesh network, comprising:

selecting a routing path between a client and a gateway;

selecting a transmission channel for each hop of the selected routing path;

selecting an upstream versus downstream orientation of at least one access node within the selected routing path, wherein the orientation of at least one access node is able to rotate;

selecting channel filtering within the at least one access node within the selected routing path, comprising:

selecting a first filter bank of at least 2 but less than N filters for filtering a first transmit/receive signal of a first radio; and selecting a second filter bank of at least 2 but less than N filters for filtering a second transmit/receive signal of a second radio, at least one of the pass-bands of the second filter bank being different than the pass-bands of the first filter bank;

wherein N is greater than 2, and wherein the combination of the first radio and the second radio are operable to transmit/receive on all N transmission channels.

4. The method of claim 3, wherein selecting a routing path comprises determining the routing path that provides a maximal throughput.

5. The method of claim 3, wherein selecting a transmission channel for each hop of the selected routing path comprises selecting each transmission channel for minimizing interference.

6. The method of claim 3, wherein the orientation is selected based upon filters available to the radios within the access node.

7. The method of claim 3, wherein selecting channel filtering within the at least one access node within the selected routing path comprises selecting the first filter bank within the first radio of at least one access node that is complementary with the second filter bank within the second radio of the access node.

* * * * *